United States Patent
Fujita (10) Patent No.: US 9,940,408 B2
(45) Date of Patent: Apr. 10, 2018

(54) TRIGGER QUERY OBTAINING APPARATUS, TRIGGER QUERY OBTAINING METHOD, AND NON-TRANSITORY COMPUTER READABLE RECORDING MEDIUM

(71) Applicant: YAHOO JAPAN CORPORATION, Tokyo (JP)

(72) Inventor: Sumio Fujita, Tokyo (JP)

(73) Assignee: YAHOO JAPAN CORPORATION, Tokyo (JP)

( * ) Notice: Subject to any disclaimer, the term of this patent is extended or adjusted under 35 U.S.C. 154(b) by 443 days.

(21) Appl. No.: 14/319,382

(22) Filed: Jun. 30, 2014

(65) Prior Publication Data

US 2015/0026151 A1    Jan. 22, 2015

(30) Foreign Application Priority Data

Jul. 19, 2013    (JP) .................................. 2013-150275

(51) Int. Cl.
*G06F 17/30*      (2006.01)

(52) U.S. Cl.
CPC .. *G06F 17/30958* (2013.01); *G06F 17/30864* (2013.01)

(58) Field of Classification Search
CPC ...................... G06F 17/30958; G06F 17/30864
See application file for complete search history.

(56) References Cited

U.S. PATENT DOCUMENTS

| | | | | |
|---|---|---|---|---|
| 2009/0259646 | A1* | 10/2009 | Fujita | G06F 17/3064 |
| 2012/0265779 | A1* | 10/2012 | Hsu | G06F 17/3064 |
| | | | | 707/767 |
| 2013/0262485 | A1* | 10/2013 | Li | G06F 17/30699 |
| | | | | 707/754 |
| 2014/0195542 | A1* | 7/2014 | Larson | G06F 17/30486 |
| | | | | 707/741 |

FOREIGN PATENT DOCUMENTS

| | | |
|---|---|---|
| JP | 2013088923 A | 5/2013 |
| JP | A-2013-084264 | 5/2013 |

OTHER PUBLICATIONS

Apr. 23, 2015 Office Action issued in Japanese Application No. 2013-150275.
Uno, Hiroyuki, "Web Page Ranking Technology," Operations Research as a Management Science, The Institute of Japanese Union of Scientists & Engineers, Jun. 1, 2012.

* cited by examiner

*Primary Examiner* — Shew Fen Lin
(74) *Attorney, Agent, or Firm* — Oliff PLC (57) ABSTRACT

A trigger query obtaining apparatus includes a graph creating unit, a score calculation unit, a trigger query obtaining unit, and an output unit. The graph creating unit creates a minimal directed graph having nodes each corresponding to a search query included in one of two search logs, and a link directed from one node to another node. The score calculation unit calculates a score for each node of a directed graph composed of minimal directed graphs, using a seed query.

(Continued)

The trigger query obtaining unit obtains a trigger query that is a search query corresponding to a node having a score that satisfies a condition. The output unit outputs the trigger query.

9 Claims, 7 Drawing Sheets

| SEARCH LOG ID | SEARCH QUERY | WEB PAGE IDENTIFIER | RANKING INFORMATION | USER IDENTIFICATION INFORMATION | POINT-IN-TIME INFORMATION |
|---|---|---|---|---|---|
| ... | ... | ... | ... | ... | ... |
| 100 | BOOK XXX | http://aaa.web | 3 | Session100 | 12:00 |
| 101 | XXX COMIC | http://aaa.web | 5 | Session200 | 12:01 |
| 102 | BOOK YY XXX | http://aaa.web | 2 | Session300 | 12:02 |
| 103 | BOOK ZZZ | http://aaa.web | 1 | Session400 | 12:02 |
| 104 | BOOK XXX MAIL ORDER | http://ccc.web | 2 | Session500 | 12:03 |
| 105 | BOOK yyy | http://bbb.web | 4 | Session100 | 12:04 |
| 106 | XXX COMIC | http://aaa.web | 5 | Session600 | 12:05 |
| ... | ... | ... | ... | ... | ... |

FIG. 5

| SEED QUERY ID | SEED QUERY | CATEGORY INFORMATION |
|---|---|---|
| ... | ... | ... |
| 201 | BOOK XXX | BOOKS |
| 202 | BOOK ZZZ | BOOKS |
| 203 | BOOK XYy | BOOKS |
| ... | ... | ... |
| 301 | AUTOMOBILE X | VEHICLES |
| 302 | CAR Y | VEHICLES |
| 303 | VAN Z | VEHICLES |
| ... | ... | ... |

FIG. 6

| CATEGORY INFORMATION | TYPE OF SPECIAL SEARCH |
|---|---|
| BOOKS | SHOPPING SEARCH |
| VEHICLES | SHOPPING SEARCH |
| VEHICLES | AGENT SEARCH |
| VEHICLES | XY INSURANCE |
| LOCATIONS | MAP SEARCH |
| : | : |

FIG. 7

| TRIGGER QUERY ID | TRIGGER QUERY |
|---|---|
| 1 | BOOK XXX |
| 2 | BOOK XYY |
| 3 | BOOK XXX YY |
| 4 | BOOK yyy |

TRIGGER QUERY OBTAINING APPARATUS, TRIGGER QUERY OBTAINING METHOD, AND NON-TRANSITORY COMPUTER READABLE RECORDING MEDIUM

CROSS-REFERENCE TO RELATED APPLICATIONS

The present invention contains subject matter related to Japanese Patent Application No. 2013-150275 filed in the Japan Patent Office on Jul. 19, 2013, the entire contents of which are incorporated herein by reference.

BACKGROUND OF THE INVENTION

1. Field of the Invention

The present invention relates to a trigger query obtaining apparatus and the like for obtaining trigger queries.

2. Description of the Related Art

In recent years, search engines have been used on the Internet on a daily basis. When a query having one or more keywords to be used for a search is input, a search engine outputs search results for the query. The input query may be sometimes used for a purpose other than searching. One example is keyword-targeted advertising in which an advertisement corresponding to the input query is distributed (for example, see Japanese Unexamined Patent Application Publication No. 2013-84264). In keyword-targeted advertising, when a query associated with a preset advertising keyword is entered, an advertisement corresponding to the advertising keyword is distributed.

Keyword-targeted advertising has a problem in that an advertisement will not be so often displayed if the number of advertising keywords is small. In keyword-targeted advertising, for example, if "cabbage" and "lettuce" are set in advance as advertising keywords for a vegetable market, an advertisement will not be displayed in response to a non-advertising keyword such as "tomato". In this manner, it is more desirable to have more keywords corresponding to information to be presented. However, a set of keywords that cover the information is difficult to obtain by human effort.

In general, it is difficult to obtain a set of keywords that cover a certain category by human effort.

SUMMARY OF THE INVENTION

Accordingly, it is desirable to obtain a set of keywords for a certain category automatically or without human intervention by using logs of queries which have been used for a search.

In an aspect of the present invention, a trigger query obtaining apparatus includes a graph creating unit, a score calculation unit, a trigger query obtaining unit, and an output unit. The graph creating unit is configured to create a minimal directed graph. The minimal directed graph is a smallest directed graph unit having nodes and a link directed from one of the nodes to another node. Each of the nodes corresponds to a search query included in two search logs having relevance among at least two search logs each including a search query used for a search for obtaining a web page. The search query is a query including one or more keywords. The score calculation unit is configured to calculate a score of each node of a directed graph including minimal directed graphs created by the graph creating unit, by propagating the score of the node from a seed query, based on link analysis for relevance to the seed query. The seed query is a query including a keyword belonging to a specific category. The trigger query obtaining unit is configured to obtain a trigger query. The trigger query is a search query corresponding to a node having a score, calculated by the score calculation unit, that satisfies a predetermined condition, and is a search query including a keyword for a category identical to a category of a keyword included in a seed query. The output unit is configured to output the trigger query obtained by the trigger query obtaining unit.

In the trigger query obtaining apparatus, the graph creating unit may be configured to create a minimal directed graph having two nodes each corresponding to a search query included in one of two search logs, and a link directed from one of the two nodes which corresponds to a search query having a wider search range to the other one of the two nodes.

In the trigger query obtaining apparatus, furthermore, each of the at least two search logs may further include web page identification information identifying a web page selected by a user in search results for a search query included in the search log. The graph creating unit may be configured to create a minimal directed graph having two nodes each corresponding to a search query included in one of two search logs, and a link directed from one of the two nodes to the other one of the two nodes, the two search logs being two search logs including identical web page identification information, at least one of which is a search log having a search query for which the web page identification information has been most frequently selected in the at least two search logs, the other one of the two nodes being a node corresponding to the search query for which the web page identification information has been most frequently selected.

In the trigger query obtaining apparatus, furthermore, each of the at least two search logs may further include web page identification information identifying a web page selected by a user in search results for a search query included in the search log. The graph creating unit may be configured to create a minimal directed graph having two nodes each corresponding to a search query included in one of two search logs, and a link directed from one of the two nodes to the other one of the two nodes, the two search logs being two search logs including identical web page identification information and including search queries that are in a subsumption relationship, the one of the two nodes being a node corresponding to a subsumed search query in the search queries.

In the trigger query obtaining apparatus, furthermore, each of the at least two search logs may further include web page identification information identifying a web page selected by a user in search results for a search query included in the search log, and ranking information indicating a rank of the web page identification information in the search results. The graph creating unit may be configured to create a minimal directed graph having two nodes each corresponding to a search query included in one of two search logs, and a link directed from one of the two nodes to the other one of the two nodes, the two search logs being two search logs including identical web page identification information, at least one of which is a search log having highest ranking information, the other one of the two nodes being a node corresponding to the search query included in the search log having the highest ranking information.

In the trigger query obtaining apparatus, furthermore, the graph creating unit may be configured to create a minimal directed graph having two nodes each corresponding to a search query included in one of two search logs including search queries that are in a subsumption relationship, and a link directed from one of the two nodes to the other one of the two nodes, the one of the two nodes being a node corresponding to a subsumed search query in the search queries.

In the trigger query obtaining apparatus, furthermore, each of the at least two search logs may further include point-in-time information concerning a point in time when a search query included in the search log was used for a search, and user identification information identifying a user who input the search query. The graph creating unit may be configured to create a minimal directed graph having two nodes each corresponding to a search query included in one of two search logs for which points in time indicated by the point-in-time information are within a predetermined period of time, and a link directed from one of the two nodes to the other one of the two nodes, the one of the two nodes being a node corresponding to a search query included in one of the two search logs which has point-in-time information indicating an earlier point in time.

The trigger query obtaining apparatus may further include a trigger query storage unit, a query receiving unit, and a dedicated search result output unit. The trigger query storage unit may be configured to store the trigger query. The query receiving unit may be configured to receive a new query from a terminal device, the new query being a query including a keyword to be used for a search. The dedicated search result output unit may be configured to obtain and output, in a case where the new query matches any one of trigger queries stored in the trigger query storage unit, a result of a trigger-query-dedicated search for a category of a keyword included in a seed query used to obtain the matched trigger query. The output unit may be configured to accumulate a trigger query in the trigger query storage unit.

According to an aspect of the present invention, a set of keywords for a certain category may be obtained automatically or without human intervention by using logs of queries which have been used for a search.

DETAILED DESCRIPTION OF THE PREFERRED EMBODIMENTS

A trigger query obtaining apparatus and the like according to an exemplary embodiment will be described with reference to the drawings. In the following exemplary embodiment, like numbered elements in the same or different drawings perform equivalent operations, and thus redundant descriptions may be omitted.

A description will be given of a trigger query obtaining apparatus 1 configured to create a directed graph using search logs and to obtain trigger queries using the directed graph.

Figure 1:
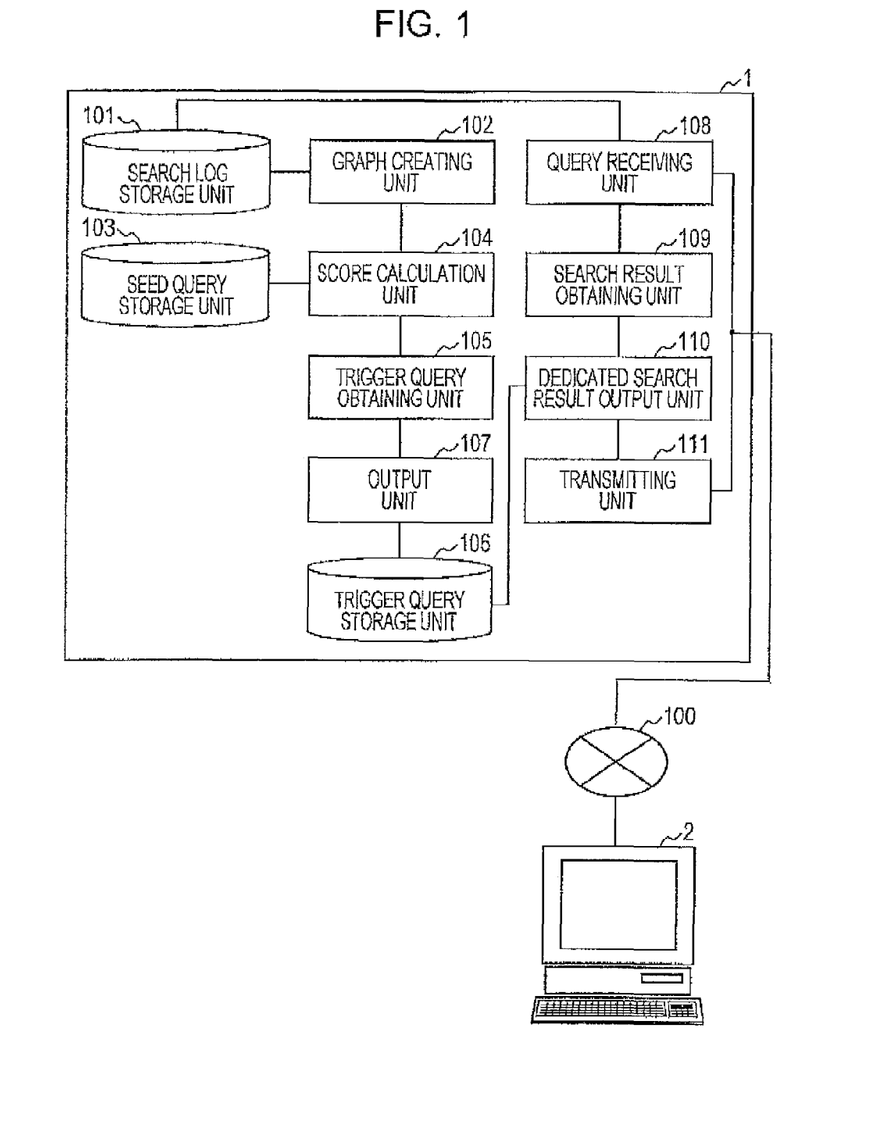
FIG. 1 is a block diagram of a trigger query obtaining apparatus according to an exemplary embodiment.

FIG. 1 is a block diagram of the trigger query obtaining apparatus 1 according to this exemplary embodiment. The trigger query obtaining apparatus 1 includes a search log storage unit 101, a graph creating unit 102, a seed query storage unit 103, a score calculation unit 104, a trigger query obtaining unit 105, a trigger query storage unit 106, an output unit 107, a query receiving unit 108, a search result obtaining unit 109, a dedicated search result output unit 110, and a transmitting unit 111. The trigger query obtaining apparatus 1 may be connected to one or more than one terminal device 2 via a network 100. The network 100 is a wired or wireless communication network, examples of which include the Internet, an intranet, a local area network (LAN), and a public telephone network. The terminal device 2 may be any terminal capable of accessing the network 100. The terminal device 2 may be, for example, a desktop personal computer, a notebook personal computer, a smartphone, a personal digital assistant (PDA), or the like.

The search log storage unit 101 stores at least two search logs, each including a search query that is a query having one or more than one keyword. A search query is a query used for a search for obtaining websites or web pages. Two search queries, each including two or more keywords, in which the orders of the keywords are different may be handled as the same search query or different search queries. That is, the search query "'keyword A' 'keyword B'" and the search query "'keyword B' 'keyword A'" may be handled as the same search query or different search queries. In the following, determinations for queries each having two or more keywords, such as determination of whether or not the queries completely match, determination of whether or not the queries partially match, or determination of whether or not one of the queries is subsumed by the other, may or may not be based on consideration of the order of the keywords. A search log may or may not include information other than a search query. Information included in a search log, other than a search query, may be, for example, web page identification information, ranking information, point-in-time information, user identification information, or a combination of any two or more of them. In the following, information included in a search log, such as "point-in-time information included in a search log having a search query", may be designated as, for example, "point-in-time information corresponding to a search query".

The web page identification information is information that identifies a web page selected by a user among search results for a search query included in a search log having the web page identification information. Search results for a search query are the results of a web search performed using a keyword included in the search query, and are a list of pieces of information that identify web pages including the keyword. The web page identification information may be a uniform resource locator (URL), an Internet protocol (IP) address, the ID of a web page, or the like. The ID of a web page may be information associated with information such as the URL or IP address of the web page using, for example, information stored in a storage unit (not illustrated) or an external device (not illustrated).

The ranking information is information indicating the rank of web page identification information selected by a user among a list of web pages that are search results for a search query included in a search log having the ranking information. The rank of the web page identification information may be a rank in the order of the list obtained by the search engine that obtains web pages in accordance with the search query, or may be a rank in the order in which pieces of information including search results are displayed. The information including search results is, for example, information including the results of a normal search and the results of a special search.

The point-in-time information is information concerning the point in time when a search query included in a search log having the point-in-time information was used for a search. The point-in-time information may be, for example, information indicating the point in time when a search query was accepted by a device having a search engine that obtains web pages, information indicating the point in time when the search engine started searching, information indicating the point in time when the search engine finished searching, information indicating the point in time when the device having the search engine output search results, or information indicating the point in time when a user who used the terminal device that had accepted the search results selected any web page identification information from among the search results.

The user identification information is information that identifies a user who entered a search query included in a search log having the user identification information. The user identification information may be, for example, an IP address, a session ID, login information on the user, or the like. The session ID may be information managed by Cookie, or may be information managed by any other method.

A search log may be accumulated in the search log storage unit 101 in any desired way. For example, a search log may be accumulated in the search log storage unit 101 via a recording medium, or a search log transmitted via a communication network or the like may be accumulated in the search log storage unit 101. Alternatively, a search log input via an input device may be accumulated in the search log storage unit 101. In a case where a query received by a receiving unit such as the query receiving unit 108 is used for a search, a search log including the received query, which is a search query, may be accumulated in the search log storage unit 101.

The graph creating unit 102 creates a minimal directed graph that is a smallest unit of a directed graph. A minimal directed graph is a graph having two nodes and a link connecting the nodes. The link has a direction. The minimal directed graph created by the graph creating unit 102 is a directed graph having two nodes each corresponding to a search query included in one of two search logs having relevance, and a link directed from one of the nodes to the other node. For example, the graph creating unit 102 may create a minimal directed graph having two nodes each corresponding to a search query included in one of two search logs, and a link directed from one of the two nodes which corresponds to the search query having a wider search range to the other node. The search range may also be called an information range which is obtained as a result of a search. Specific examples of the minimal directed graph include ("dictionaries"→"electronic dictionaries") and ("electric home appliances"→"microwave ovens"). The graph creating unit 102 may create a minimal directed graph by generating two nodes and a link to the two nodes. The graph creating unit 102 may create, for example, (1) a minimal directed graph satisfying a common-click condition based on most frequent search criteria, (2) a minimal directed graph satisfying a common-click condition based on character-string extension criteria, (3) a minimal directed graph satisfying a common-click condition based on best search criteria, (4) a minimal directed graph satisfying a common-query condition, or (5) a minimal directed graph satisfying a common-user condition.

The graph creating unit 102 may create a minimal directed graph using any one or more of the conditions (1) to (5) described above. In the following, a detailed description will be given of a method for creating a minimal directed graph satisfying each of the conditions described above. In the description of the individual conditions, it is assumed that the search log storage unit 101 has stored therein search logs illustrated in FIG. 4. A table illustrated in FIG. 4 includes search log IDs, search queries, web page identification information, ranking information, user identification information, and point-in-time information. For example, a search log with the search log ID "100" has the search query "Book XXX", the web page identification information "http://aaa.web", the ranking information "3", the user identification information "Session100", and the point-in-time information "12:00". Depending on the condition, some of the pieces of information described above may not necessarily be included in a search log.

Figure 2:
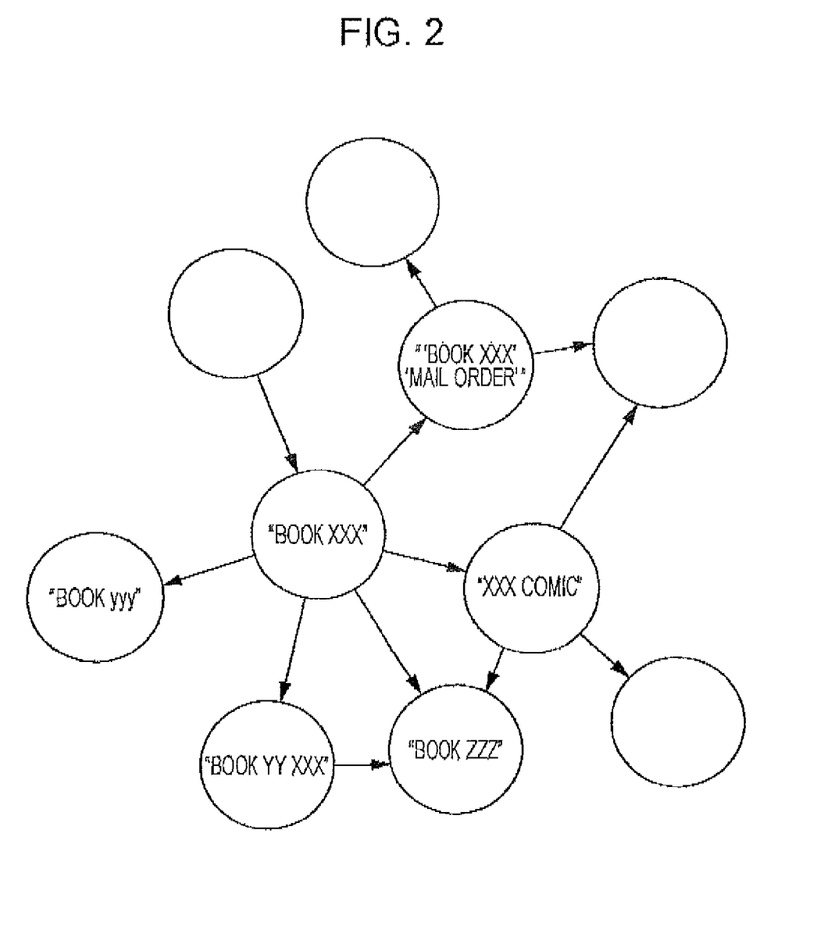
FIG. 2 is a diagram illustrating an example of a directed graph composed of minimal directed graphs created by a graph creating unit according to the exemplary embodiment.

(1) Minimal Directed Graphs Satisfying the Common-Click Condition Based on Most Frequent Search Criteria The common-click condition based on most frequent search criteria is a condition available when search logs include search queries and web page identification information and when it is possible to obtain the number of selections of the web page identification information using the same search query. The number of selections may or may not be included in a search log. If the number of selections is not included in a search log, the number of selections may be calculated using the search log. In a case where the number of selections is to be calculated using a search log, the graph creating unit 102 may obtain, for example, the number of search logs including search query A and web page identification information B. In this case, the number of search logs is used as the number of selections. When creating a minimal directed graph using the common-click condition based on most frequent search criteria, the graph creating unit 102 may create a minimal directed graph having two nodes, each corresponding to one of search queries included in two search logs including the same web page identification information, at least one of which is a search log having a search query for which the web page identification information has been most frequently selected in two or more search logs, and a link directed from one of the two nodes to the other node corresponding to the search query for which the web page identification information has been most frequently selected. The graph creating unit 102 may create a plurality of minimal directed graphs each having a link to a node corresponding to a search query for which specific web page identification information has been most frequently selected from a node corresponding to another search query for which the web page identification information has been selected. The two or more search logs may be two search logs including the same web page identification information, or may be search logs stored in the search log storage unit 101. Specifically, as illustrated in FIG. 2, the graph creating unit 102 creates the minimal directed graph ("Book XXX"→"XXX Comic") using the search log ID "100" and the search log IDs "101" and "106". The minimal directed graph ("Book XXX"→"XXX Comic") is created because the web page identification information "http://aaa.web" is common between the search log ID "100" and the search log ID "101" and the search query "Book XXX" is included in one search log, i.e., the search log with the search log ID "100", while the search query "XXX Comic" is included in two search logs, i.e., the search logs with the search log IDs "101" and "106", where the latter has been selected the most number of times.

(2) Minimal Directed Graphs Satisfying the Common-Click Condition Based on Character-String Extension Criteria The common-click condition based on character-string extension criteria is a condition available when search logs include search queries and web page identification information. When creating a minimal directed graph using the common-click condition based on character-string extension criteria, the graph creating unit 102 creates a minimal directed graph having two nodes, each corresponding to one of search queries included in two search logs including the same web page identification information, the search queries being in a subsumption relationship, and a link directed from one of the two nodes which corresponds to the search query subsumed by the remaining search query to the other node. The term "search queries being in a subsumption relationship" refers to a relationship between a given search query and a search query having a keyword that contains all the keywords contained in the given search query and that does not completely match any of the keywords contained in the given search query. In this case, the former, given search query is subsumed by the latter search query. The subsumption relationship between search queries may be, for example, a relationship between a given keyword and a keyword obtained by extending the given keyword, or a relationship between a given keyword and a set of keywords including the given keyword and one or more different keywords. In the determination of the subsumption relationship, no consideration is given to the number of keywords, the order of keywords, and how keywords are separated. Furthermore, the term "subsumption relationship", as used herein, is not used to include complete matching. Specific examples of the subsumption relationship between search queries may include the relationship between a given keyword and an extended keyword, such as the search query "Book XXX" and the search query "Book YY XXX", the relationship between a given keyword and a set of keywords including the given keyword and one or more additional different keywords, such as the search query "Book XXX" and the search query "'Book XXX' 'Mail Order'", and the relationship between the search query "'Book XXX' 'Mail Order'" and the search query "'Book YY XXX' 'Mail Order Price'". Here, a space is used as a separator between keywords. In this case, spaces between single quotation marks are not regarded as separators. Specifically, as illustrated in FIG. 2, the graph creating unit 102 creates the minimal directed graph ("Book XXX"→"Book YY XXX") using the search log ID "100" and the search log ID "102". The minimal directed graph ("Book XXX"→"Book YY XXX") is created because the web page identification information "http://aaa.web" is common between the search log ID "100" and the search log ID "102" and the search query "Book XXX" of the search log ID "100" is subsumed by the search query "Book YY XXX" of the search log ID "102".

(3) Minimal Directed Graphs Satisfying the Common-Click Condition Based on Best Search Criteria The common-click condition based on best search criteria is a condition available when search logs include search queries, web page identification information, and ranking information. When creating a minimal directed graph using the common-click condition based on best search criteria, the graph creating unit 102 creates a minimal directed graph having two nodes, each corresponding to one of search queries included in two search logs including the same web page identification information, at least one of which is a search log having the highest ranking information, and a link directed from one of the two nodes to the other node corresponding to the search query included in the search log having the highest ranking information. Specifically, as illustrated in FIG. 2, the graph creating unit 102 creates the minimal directed graph ("Book XXX"→"Book ZZZ") using the search log ID "100" and the search log ID "103". The minimal directed graph ("Book XXX"→"Book ZZZ") is created because the web page identification information "http://aaa.web" is common between the search log ID "100" and the search log ID "103" and the ranking information "1" of the search log ID "103" indicates the highest rank.

(4) Minimal Directed Graphs Satisfying the Common-Query Condition

When creating a minimal directed graph using the common-query condition, the graph creating unit 102 creates a minimal directed graph having two nodes, each corresponding to one of search queries included in two search logs including search queries that are in a subsumption relationship, and a link directed from one of the two nodes which corresponds to the search query subsumed by the remaining search query to the other node. The term "search queries that are in a subsumption relationship" is equivalent to the term "search queries being in a subsumption relationship" as described in the "(2) Minimal directed graphs satisfying the common-click condition based on character-string extension criteria" section given above. Specifically, as illustrated in FIG. 2, the graph creating unit 102 creates the minimal directed graph ("Book XXX"→"'Book XXX' 'Mail Order'") using the search log ID "100" and the search log ID "104". The minimal directed graph ("Book XXX"→"'Book XXX' 'Mail Order'") is created because of the relationship between the search log ID "100" and the search log ID "104" in which the search query "Book XXX" of the search log ID "100" is subsumed by the search query "'Book XXX' 'Mail Order'" of the search log ID "104".

(5) Minimal Directed Graphs Satisfying the Common-User Condition

The common-user condition is a condition available when search logs include search queries, user identification information, and point-in-time information. When creating a minimal directed graph using the common-user condition, the graph creating unit 102 creates a minimal directed graph having two nodes, each corresponding to one of search queries included in two search logs for which the points in time indicated by the point-in-time information are within a predetermined period of time, and a link directed from one of the two nodes which corresponds to the search query included in the search log having the point-in-time information indicating an earlier point in time to the other node. The predetermined period of time may be preferably several minutes, or may be several hours or the like. The predetermined period of time may be set by a setting unit (not illustrated) in accordance with an instruction accepted by an accepting unit (not illustrated) from a user. The setting of the predetermined period of time may include changing a time length. The graph creating unit 102 may create a minimal directed graph using only the relationship between a given search log and a search log immediately subsequent to the given search log for which the point in time indicated by the point-in-time information is within a predetermined period of time starting from the point in time indicated by the point-in-time information included in the given search log, or may create a minimal directed graph using the relationship between the given search log and each of a plurality of search logs for which the points in time indicated by the point-in-time information are within the predetermined period of time. Specifically, for example, if the predetermined period of time is ten minutes, as illustrated in FIG. 2, the graph creating unit 102 creates the minimal directed graph ("Book XXX"→"Book yyy") using the search log ID "100" and the search log ID "105". The minimal directed graph ("Book XXX"→"Book yyy") is created because the user identification information "Session100" is common between the search log ID "100" and the search log ID "105" and it is within ten minutes from the point-in-time information "12:00" of the search log ID "100" to the point-in-time information "12:03" of the search log ID "104".

The conditions described above may be stored in a storage unit (not illustrated). The graph creating unit 102 may create minimal directed graphs using some of the conditions described above or may create minimal directed graphs using all of them.

The seed query storage unit 103 stores one or more seed queries, each of which is a query including one or more than one keyword belonging to a specific category. A seed query is a query used by the score calculation unit 104 to place a weight to a specific node. A seed query is a query which may be part of a trigger query and is a source query from which the trigger query is obtained. In most cases, seed queries are information created by persons. The specific category may be, for example, "fruits", "vehicles", "books", or any other category. For the category "fruits", examples of the seed query may include "watermelon", "orange", and "strawberry". Examples of a trigger query which may be obtained using the seed query include "melon", "navel orange", and "dragon fruit". The seed query storage unit 103 may store only a seed query corresponding to one category or seed queries each corresponding to one of two or more categories. In a case where the seed query storage unit 103 stores seed queries each corresponding to one of two or more categories, the seed query storage unit 103 preferably further includes category identification information that is information which identifies each of the categories corresponding to the seed queries. The category identification information may be information indicating a category, or an ID or the like which identifies information indicating a category stored in a storage unit (not illustrated) or an external device.

A seed query may be accumulated in the seed query storage unit 103 in any desired way. For example, a seed query may be accumulated in the seed query storage unit 103 via a recording medium, or a seed query transmitted via a communication network or the like may be accumulated in the seed query storage unit 103. Alternatively, a seed query input via an input device may be accumulated in the seed query storage unit 103. The seed query storage unit 103 may be a storage unit configured to temporarily store a seed query accepted by an accepting unit (not illustrated). In this case, the seed query stored in the seed query storage unit 103 may be information which may be updated in response to user input.

The score calculation unit 104 calculates a score of each node of a directed graph composed of minimal directed graphs created by the graph creating unit 102, by propagating the score of the node from a seed query, based on link analysis for relevance to the seed query. A directed graph composed of a plurality of minimal directed graphs is a directed graph in which nodes corresponding to the same search query among search queries corresponding to nodes of the respective minimal directed graphs are regarded as the same node. The scores calculated by the score calculation unit 104 may be scores such that, as a result, a keyword included in a search query corresponding to a node has a large score value or a small score value when the keyword belongs to the same category as the category to which a keyword included in a seed query belongs. That is, the score may be information having a large value when the keyword in the search query is semantically close to the keyword in the seed query and a small value when the keywords are semantically far from each other, or may be information having a small value when the keyword in the search query is semantically close to the keyword in the seed query and a large value when the keywords are semantically far from each other.

The calculation of "a score, by propagating a score of a node from a seed query, based on link analysis for relevance to the seed query" may be the calculation of a score using a technique of performing link analysis by placing a weight to a specific node, such as Biased-PageRank, Personalized-PageRank, or Hyperlink-Induced Topic Search (HITS) for assigning a weight to a node, or may be the calculation of a score by performing four fundamental operations of arithmetic on the values calculated using the technique described above. A seed query is used to identify, for example, a specific node for which a weight is to be set. For example, the score calculation unit 104 may set a weight for a node corresponding to a search query that matches a seed query. For Biased-PageRank, reference may be made to, for example, Japanese Unexamined Patent Application Publication No. 2011-28509. Biased-PageRank, Personalized-PageRank, and the like are well established, and a detailed description thereof is thus omitted. In link analysis, the score calculation unit 104 may set a weight for a link. The score calculation unit 104 may set a weight for a link using information which may be used to determine similarity between keywords, such as a thesaurus, so as to increase the transition probability of nodes corresponding to more similar search queries, or may set a weight for a link so as to increase the transition probability as the number of times common web page identification information has been selected increases. Alternatively, the score calculation unit 104 may set a weight for a link using machine learning. In a case where machine learning is used for the setting of a weight, the score calculation unit 104 may perform machine learning and set the weight of a link using the result of learning. More specifically, for example, the score calculation unit 104 may perform machine learning using, as correct answer data with high transition probability, a set of queries satisfying a combination of one or more conditions among the common-click condition, the common-query condition, and the common-user condition, where the numbers of times or the proportions of times web page identification information has been selected in various conditions, such as the number of times web page identification information common to two search queries has been selected and the number of times the web page identification information in one of the search queries has been selected, are used as features in machine learning. Alternatively, the score calculation unit 104 may perform machine learning using externally given supervisory information concerning relevance between queries and set the weight of a link using the result of learning, where one or more of attributes including the numbers of times or the proportions of times web page identification information has been selected in various conditions, such as the number of times web page identification information common to two search queries has been selected and the number of times the web page identification information in one of the search queries has been selected, the degree to which the common-click condition is satisfied, the degree to which the common-query condition is satisfied, and the degree to which the common-user condition is satisfied, are used in combination as a feature in machine learning.

In a case where seed queries each corresponding to one of a plurality of categories are stored in the seed query storage unit 103, the score calculation unit 104 may calculate, for each category, a score of each of the nodes included in the directed graph.

The trigger query obtaining unit 105 obtains a trigger query that is a search query corresponding to a node for which the score calculated by the score calculation unit 104 satisfies a predetermined condition. The trigger query is information including a keyword for the same category as the category of a keyword included in a seed query. The trigger query is a query that triggers the dedicated search result output unit 110 to call a dedicated search. The trigger query obtained by the trigger query obtaining unit 105 is a query including a keyword for the same category as the category of a keyword included in the seed query used by the score calculation unit 104. The predetermined condition may be as follows: In a case where the score has a large value when the keyword in the trigger query is semantically close to the keyword in the seed query, the value of the score may be higher if the predetermined condition is more satisfied. In this case, the predetermined condition may be a value higher than a predetermined threshold value, a value higher than a threshold value obtained by multiplying the average score by a value larger than 1, or a value that is within the top N scores or within the top R percent of all the scores, where N is a natural number greater than or equal to 1 and R is a real number larger than 0 and smaller than 100. The predetermined condition may also be as follows: If the score has a small value when the keyword in the trigger query is semantically close to the keyword in the seed query, the value of the score may be lower if the predetermined condition is more satisfied. In this case, the predetermined condition may be a value lower than a predetermined threshold value, a value lower than a threshold value obtained by multiplying the average score by a value smaller than 1, or a value that is within the bottom M scores or within the bottom L percent of all the scores, where M is a natural number greater than or equal to 1 and L is a real number larger than 0 and smaller than 100.

The trigger query storage unit 106 stores one or more than one trigger query. The trigger query storage unit 106 may store only a trigger query corresponding to one category or trigger queries each corresponding to one of two or more categories. In a case where the trigger query storage unit 106 stores trigger queries each corresponding to one of two or more categories, the trigger query storage unit 106 may store category identification information, which is used to identify the categories, in association with the trigger queries. The trigger query storage unit 106 stores a trigger query via the output unit 107.

The output unit 107 outputs the trigger query obtained by the trigger query obtaining unit 105. In this exemplary embodiment, the output unit 107 is configured to accumulate the trigger query in the trigger query storage unit 106. Instead of accumulating the trigger query, the output unit 107 may perform any other operation such as transmitting the trigger query to an external device or delivering the trigger query to other processing devices, other programs, or the like.

The query receiving unit 108 receives a new query from the terminal device 2. The new query is a query including one or more than one keyword to be used for a search. The query receiving unit 108 may accumulate the received new query in the search log storage unit 101 as a search query. In a case where a search log includes point-in-time information, the query receiving unit 108 may accumulate the new query in association with point-in-time information concerning the point in time when the new query was received. The query receiving unit 108 is generally implemented as a wireless or wired communication unit.

The search result obtaining unit 109 obtains search results of a web search performed using the new query received by the query receiving unit 108. The search results are a list of web pages including the keyword included in the new query. The search result obtaining unit 109 may obtain search results using web page information stored in a storage unit (not illustrated) or an external storage device, or may obtain search results from an external search device by transmitting the new query to the external search device. The web search performed by the search result obtaining unit 109 is a generally available web search. Web search techniques are well established, and a detailed description thereof is thus omitted.

If the new query matches any of the trigger queries, the dedicated search result output unit 110 obtains results of a trigger-query-dedicated search, and outputs the search results. The search results obtained by the dedicated search result output unit 110 are search results for the category of the keyword included in the seed query used to obtain the trigger query. The search results may be a list of pieces of information, images, or the like to identify the pages obtained as a result of a search made by category, or may be information to identify pages on which the pieces of web page identification information, images, or the like are displayed. The phrase "the new query matches any of the trigger queries" preferably means that the new query completely matches any of the trigger queries, or may mean that the new query partially matches any of the trigger queries. The phrase "the new query partially matches any of the trigger queries" may mean that, for example, the new query and any of the trigger queries are in a subsumption relationship.

The dedicated search is a search that is different from a standard web search to obtain web pages. Examples of the dedicated search may include a map search, a price search, a product search, and any other search. The dedicated search may also be a search to obtain one web page retrieved as a result of a search made using a specific trigger query. Searches which may be included in the dedicated search are well established, and a detailed description thereof is thus omitted. The type of the dedicated search to be performed by the dedicated search result output unit 110 may be selected using category-operation association information for associating categories with types of dedicated searches. The dedicated search result output unit 110 may obtain dedicated search results using information stored in a storage unit (not illustrated) or an external storage device, or may obtain dedicated search results from an external search device by transmitting the new query to the external search device. If the new query does not match any of the trigger queries, the dedicated search result output unit 110 may not necessarily obtain dedicated search results.

The transmitting unit 111 may transmit result information in response to the new query. The result information may include the search results obtained by the search result obtaining unit 109 and the dedicated search results output from the dedicated search result output unit 110. If the dedicated search result output unit 110 has not obtained dedicated search results, only the search results obtained by the search result obtaining unit 109 may be transmitted. The transmitting unit 111 may transmit search results to the terminal device 2 that transmitted the new query used to obtain the search results. The transmitting unit 111 is generally implemented as wireless or wired communication unit.

Each of the search log storage unit 101, the seed query storage unit 103, and the trigger query storage unit 106 is preferably a non-volatile recording medium, or may be implemented as a volatile recording medium.

The graph creating unit 102, the score calculation unit 104, the trigger query obtaining unit 105, the output unit 107, the query receiving unit 108, the search result obtaining unit 109, the dedicated search result output unit 110, and the transmitting unit 111 may generally be implemented by a microprocessing unit (MPU), a memory, and the like. The processing procedure of the graph creating unit 102 is generally implemented in software, and the software is recorded on a recording medium such as a read-only memory (ROM). The processing procedure may also be implemented in hardware (e.g., dedicated circuitry).

The operation of the trigger query obtaining apparatus 1 will now be described with reference to a flowchart in FIG. 3.

(Step S201) The graph creating unit 102 determines whether or not to start obtaining a trigger query. If the obtaining of a trigger query is to start, the process proceeds to step S202. If a trigger query is not to be obtained, the process proceeds to step S206. In step S201, when instructions to obtain a trigger query are accepted from a user using an accepting unit (not illustrated), the graph creating unit 102 may determine that the obtaining of a trigger query is to start. Alternatively, when a certain amount of time has elapsed since the previous trigger query was obtained, the graph creating unit 102 may determine that the obtaining of a trigger query is to start. Alternatively, if no trigger queries are stored in the trigger query storage unit 106, the graph creating unit 102 may determine that the obtaining of a trigger query is to start.

(Step S202) The graph creating unit 102 creates a minimal directed graph using a search log. The graph creating unit 102 may create as many minimal directed graphs as possible from the search logs stored in the search log storage unit 101 using one or more than one condition.

(Step S203) The score calculation unit 104 calculates the score of each node using a directed graph having the minimal directed graphs created in step S202 and using a seed query stored in the seed query storage unit 103.

(Step S204) The trigger query obtaining unit 105 obtains a trigger query that is a search query corresponding to a node with a high score among the scores calculated in step S203.

(Step S205) The output unit 107 accumulates the trigger query obtained in step S204 in the trigger query storage unit 106. Then, the process returns to step S201. If the seed query storage unit 103 stores seed queries corresponding to two or more categories, the processing of steps S203 to S205 may be repeatedly performed for each of the categories.

(Step S206) The query receiving unit 108 determines whether or not a new query has been received. If a new query has been received, the process proceeds to step S207. If a new query has not been received, the process returns to step S201.

(Step S207) The search result obtaining unit 109 obtains search results of a web search for the new query received in step S206.

(Step S208) The dedicated search result output unit 110 determines whether or not a trigger query that matches the new query received in step S206 has been stored in the trigger query storage unit 106. If a trigger query that matches the new query has been stored, the process proceeds to step S209. If a trigger query that matches the new query has not been stored, the process proceeds to step S210.

(Step S209) The dedicated search result output unit 110 obtains search results of a dedicated search for the new query received in step S206.

(Step S210) The transmitting unit 111 transmits the search results obtained in step S207 or search results obtained by merging the search results obtained in step S207 and the search results obtained in step S209. Then, the process returns to step S201.

Figure 3:
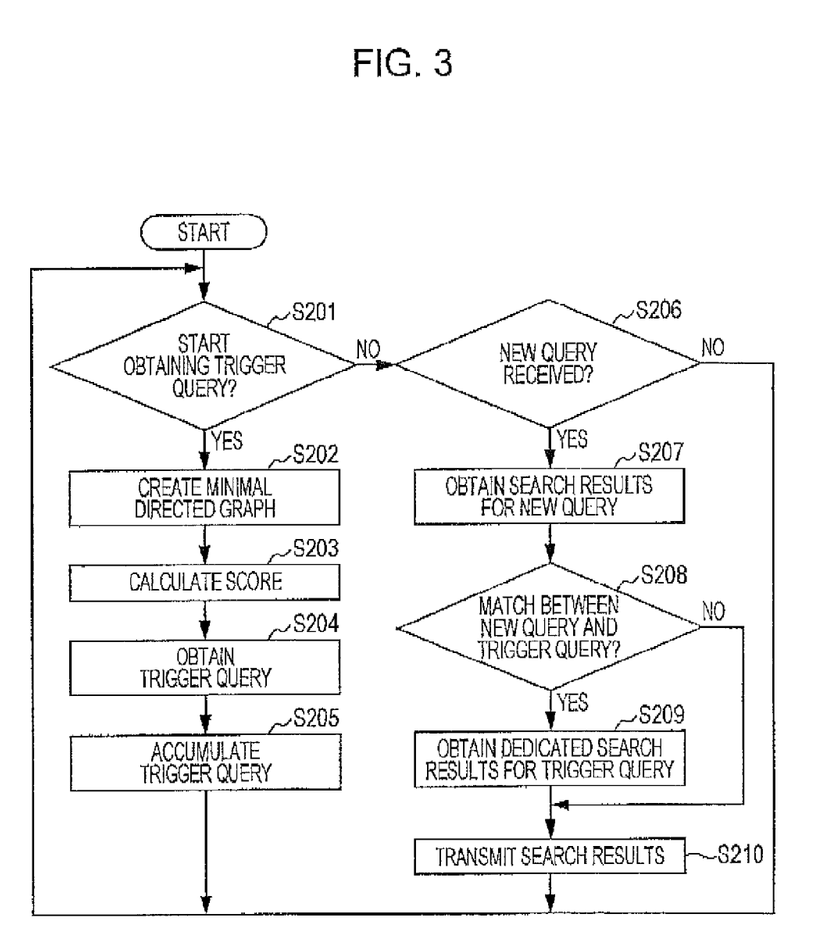
FIG. 3 is a flowchart illustrating the operation of the trigger query obtaining apparatus according to the exemplary embodiment.

In the flowchart illustrated in FIG. 3, the process ends when the power supply is turned off or due to the interruption to stop the ongoing process.

A specific operation of the trigger query obtaining apparatus 1 according to this exemplary embodiment will be described hereinafter. In this specific example, by way of example, the trigger query storage unit 106 initially stores no trigger queries. In this specific example, furthermore, category identification information is designated as category information indicating a category.

Figure 4:
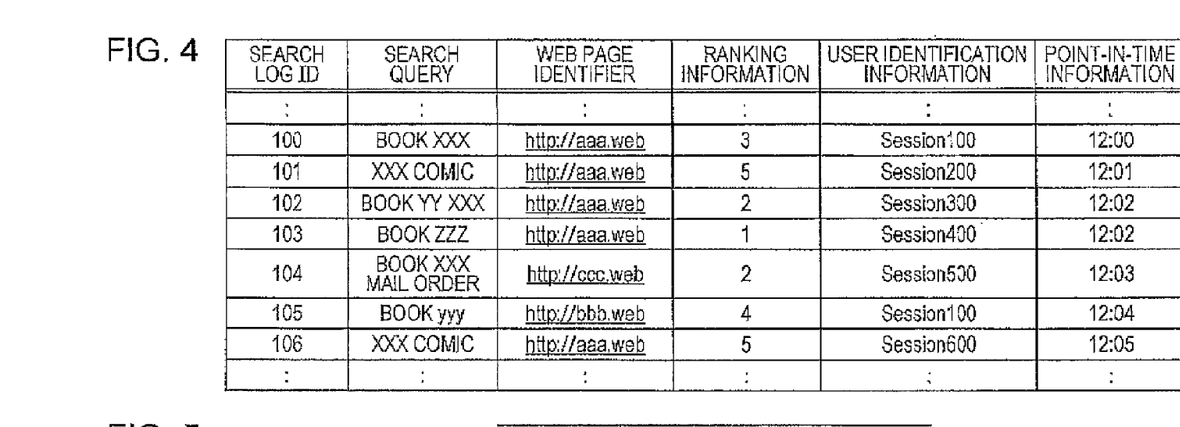
FIG. 4 is a diagram illustrating an example of search logs stored in a search log storage unit according to the exemplary embodiment.

In this specific example, by way of example, the search log storage unit 101 stores the search logs illustrated in FIG. 4. The table illustrated in FIG. 4 includes search log IDs, search queries, web page identification information, ranking information, user identification information, and point-in-time information. For example, a search log with the search log ID "100" has the search query "Book XXX", the web page identification information "http://aaa.web", the ranking information "3", the user identification information "Session100", and the point-in-time information "12:00".

Figure 5:
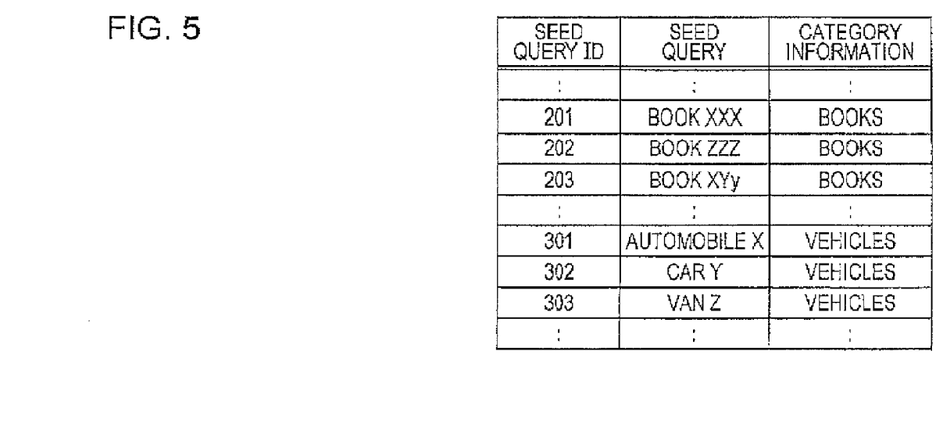
FIG. 5 is a diagram illustrating an example of seed queries stored in a seed query storage unit according to the exemplary embodiment.

In this specific example, furthermore, by way of example, the seed query storage unit 103 stores seed queries illustrated in FIG. 5. A table illustrated in FIG. 5 includes seed query IDs, seed queries, and categories. For example, the seed query ID "201" is associated with the seed query "Book XXX" and the category information "books".

Figure 6:
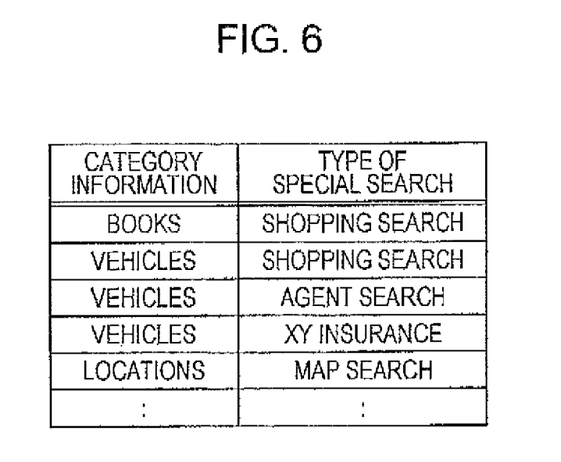
FIG. 6 is a diagram illustrating an example of the correspondence between category information and types of special searches according to the exemplary embodiment.

In this specific example, furthermore, by way of example, the category-operation association information stored in a storage unit (not illustrated) has a structure illustrated in FIG. 6. A table illustrated in FIG. 6 includes category information and types of special searches. For example, in the category-operation association information, the category information "books" is associated with the type of special search "shopping search".

Figure 7:
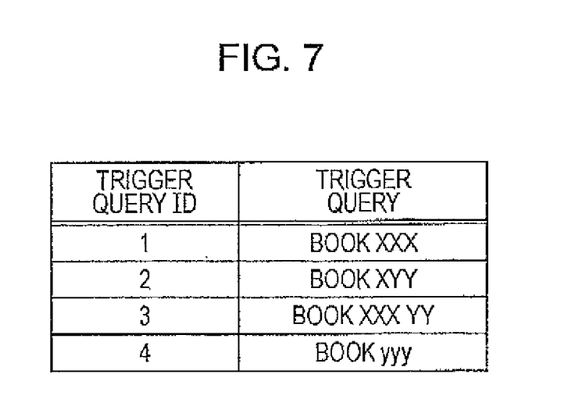
FIG. 7 is a diagram illustrating an example of trigger queries stored in a trigger query storage unit according to the exemplary embodiment.

By way of example, an administrator turns on the power supply, thereby activating the trigger query obtaining apparatus 1. Then, the graph creating unit 102 creates a minimal directed graph since no trigger queries are stored in the trigger query storage unit 106 (steps S201 to S202). When a minimal directed graph is created, the score calculation unit 104 sets the weights of the respective nodes that match seed queries corresponding to the category information "books", and calculates the scores of the nodes (step S203). When the scores are calculated, the trigger query obtaining unit 105 obtains trigger queries using the scores (step S204). When trigger queries are obtained, the output unit 107 accumulates the trigger queries in the trigger query storage unit 106 (step S205). Thus, as illustrated in FIG. 7, the trigger queries are stored in the trigger query storage unit 106. Further, trigger queries for the category information "vehicles" are also obtained and accumulated in a similar way.

Figure 8:
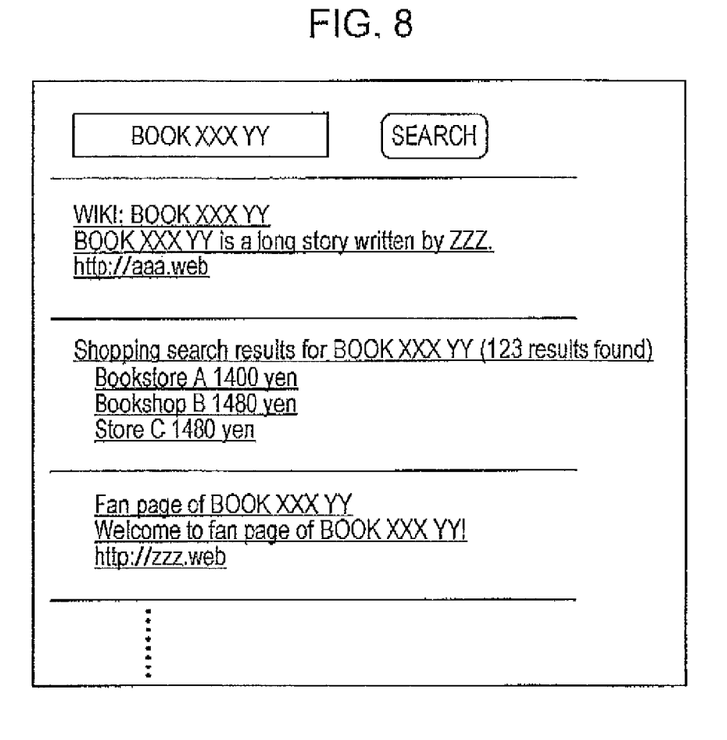
FIG. 8 is a diagram illustrating an example of the display on a terminal device according to the exemplary embodiment.

After the obtaining of trigger queries is completed, by way of example, the query receiving unit 108 receives a new query including the keyword "Book XXX YY" from the terminal device 2 (step S206). When the new query is received, the search result obtaining unit 109 obtains search results of a web search performed using the keyword "Book XXX YY" included in the new query (step S207). Since the keyword "Book XXX YY" included in the new query matches the keyword included in the trigger query with the trigger query ID "3", the dedicated search result output unit 110 obtains search results "Bookstore A 1400 yen, Bookshop B 1480 yen, Store C 1480 yen" of the "shopping search" corresponding to the category information "books" in the seed query which has been used to obtain the trigger query (steps S208 to S209). Then, the transmitting unit 111 transmits the search results obtained by the search result obtaining unit 109 and the search results obtained by the dedicated search result output unit 110 (step S210). Thus, a view illustrated in FIG. 8 is displayed on a display of the terminal device 2.

According to this exemplary embodiment, therefore, the score calculation unit 104 calculates a score for each of the nodes of a search query that matches a seed query, the scores giving weights to the nodes. Accordingly, a trigger query that is a query corresponding to the category associated with a seed query can be obtained. Thus, a set of trigger queries, which are difficult to collect by human effort, may be collected automatically or without human intervention. In addition, the graph creating unit 102 creates a link directed from a node corresponding to a search query having a wide search range to a node corresponding to a search query having a narrow search range, thereby creating a directed graph in which more repeated reference narrows down the corresponding queries. Thus, scores for obtaining trigger queries may be calculated based on link analysis. In addition, the graph creating unit 102 creates a directed graph using any one or more conditions among the common-click condition based on most frequent search criteria, the common-click condition based on character-string extension criteria, the common-click condition based on best search criteria, the common-query condition, and the common-user condition, thereby creating a directed graph that takes a plurality of techniques into account. Additionally, the dedicated search result output unit 110 obtains dedicated search results, thereby allowing efficient use of the acquired trigger queries.

The trigger queries obtained by the trigger query obtaining apparatus 1 may also be used for a purpose other than the obtaining of dedicated search results. The trigger queries may also be used as, for example, advertising keywords in a case where the trigger query obtaining apparatus 1 is an apparatus to which an advertisement corresponding to a preset advertising keyword is distributed when a query corresponding to the advertising keyword is entered.

In this exemplary embodiment, description has been made of the case where the search log storage unit 101 is included. However, the trigger query obtaining apparatus 1 may not necessarily include the search log storage unit 101. In a case where the trigger query obtaining apparatus 1 does not include the search log storage unit 101, for example, the graph creating unit 102 may create a minimal directed graph using a search log accepted by an accepting unit (not illustrated), or may create a minimal directed graph using a search log obtained from an external device that stores search logs.

In this exemplary embodiment, furthermore, description has been made of the case where the seed query storage unit 103 is included. However, the trigger query obtaining apparatus 1 may not necessarily include the seed query storage unit 103. In a case where the trigger query obtaining apparatus 1 does not include the seed query storage unit 103, for example, the score calculation unit 104 may calculate a score using a seed query accepted by an accepting unit (not illustrated), and the graph creating unit 102 may create a minimal directed graph using a seed query obtained from an external device that stores seed queries.

In this exemplary embodiment, furthermore, description has been made of the case where the query receiving unit 108, the search result obtaining unit 109, the dedicated search result output unit 110, and the transmitting unit 111 are included. However, the trigger query obtaining apparatus 1 may not necessarily include the query receiving unit 108, the search result obtaining unit 109, the dedicated search result output unit 110, or the transmitting unit 111. In a case where the trigger query obtaining apparatus 1 does not include the query receiving unit 108, the search result obtaining unit 109, the dedicated search result output unit 110, and the transmitting unit 111, the trigger query obtaining apparatus 1 may be configured to accumulate an obtained query in the trigger query storage unit 106.

In this exemplary embodiment, furthermore, description has been made of the case where the trigger query storage unit 106 is included. However, the trigger query obtaining apparatus 1 may not necessarily include the trigger query storage unit 106. In a case where the trigger query obtaining apparatus 1 does not include the trigger query storage unit 106, the output unit 107 may output a trigger query to an external storage device. The external device may be a device including the trigger query storage unit 106, the query receiving unit 108, the search result obtaining unit 109, the dedicated search result output unit 110, and the transmitting unit 111. In this case, the trigger query transmitted from the output unit 107 may be received by the query receiving unit 108, and the received trigger query may be accumulated in the trigger query storage unit 106.

In addition, software implementing the trigger query obtaining apparatus 1 according to this exemplary embodiment is a program as described below: The program may include instructions operable to cause a computer to perform operations including creating a minimal directed graph, the minimal directed graph being a smallest directed graph unit having nodes and a link directed from one of the nodes to another node, each of the nodes corresponding to a search query included in two search logs having relevance among at least two search logs each including a search query used for a search for obtaining a web page, the search query being a query including one or more keywords; calculating a score of each node of a directed graph including minimal directed graphs created in the creating, by propagating the score of the node from a seed query, based on link analysis for relevance to the seed query, the seed query being a query including a keyword belonging to a specific category; obtaining a trigger query, the trigger query being a search query corresponding to a node having a score, calculated in the calculating, that satisfies a predetermined condition, and being a search query including a keyword for a category identical to a category of a keyword included in a seed query; and outputting the trigger query obtained, in the obtaining.

In this exemplary embodiment, processing operations (or functions) may be implemented by a single device or apparatus (or system) via centralized processing, or may be implemented by a plurality of devices or apparatuses via distributed processing. Moreover, it is to be understood that, in this exemplary embodiment, two or more communication units that reside in one device or apparatus may be physically implemented as one unit.

In this exemplary embodiment, furthermore, individual components may be implemented in dedicated hardware, or components which are implementable in software may be implemented by the execution of a program. For example, a software program recorded on a recording medium such as a hard disk or a semiconductor memory may be read and executed by a program execution unit such as a central processing unit (CPU), thereby implementing the individual components.

In the program described above, functions implemented by the program described above do not include a function that is implementable only in hardware. For example, functions that are implementable only in hardware, such as an obtaining unit configured to obtain information and an output unit configured to output information, for example, a modem or an interface card, are not included in the functions implemented by the program described above.

Figure 9:
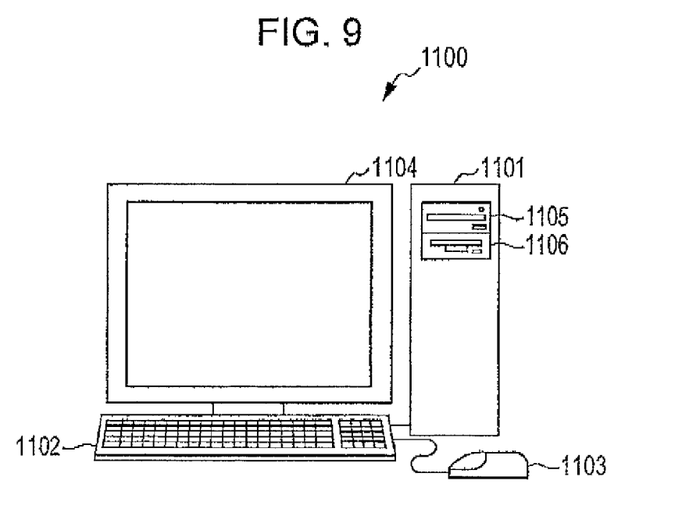
FIG. 9 is a diagram illustrating an example of the external appearance of a computer system according to the exemplary embodiment.

FIG. 9 is a schematic diagram illustrating an example of the external appearance of a computer that executes the program described above to implement the foregoing exemplary embodiment of the present invention. The foregoing exemplary embodiment may be implemented in computer hardware and in accordance with a computer program executable on the computer hardware.

In FIG. 9, a computer system 1100 includes a computer 1101, a keyboard 1102, a mouse 1103, and a monitor 1104. The computer 1101 includes a compact disc read-only memory (CD-ROM) drive 1105 and a flexible disc (FD) drive 1106.

Figure 10:
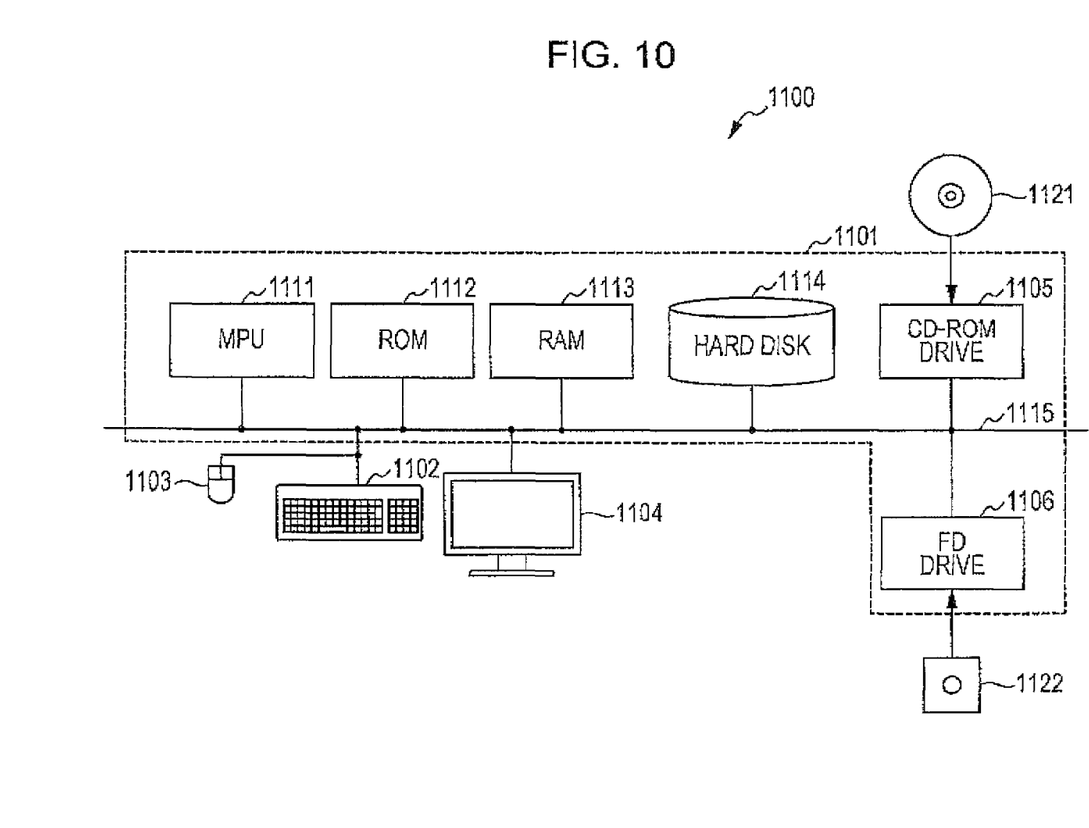
FIG. 10 is a diagram illustrating an example of a configuration of the computer system according to the exemplary embodiment.

FIG. 10 is a diagram illustrating an internal configuration of the computer system 1100. In FIG. 10, the computer 1101 includes, in addition to the CD-ROM drive 1105 and the FD drive 1106, an MPU 1111, a ROM 1112, a RAM 1113, a hard disk 1114, and a bus 1115 through which the MPU 1111, the ROM 1112, and so on are connected to one another. The ROM 1112 is configured to accumulate programs such as a boot-up program. The RAM 1113 is connected to the MPU 1111, and is configured to temporarily accumulate the instructions in an application program and to provide a temporary storage space. The hard disk 1114 is configured to accumulate the application program, a system program, and data. The computer 1101 may include a network card (not illustrated) that provides access to a LAN.

A program for causing the computer system 1100 to execute the functions of the foregoing exemplary embodiment of the present invention or the like may be accumulated in a CD-ROM 1121 or an FD 1122, and may be transferred to the hard disk 1114 when the CD-ROM 1121 or the FD 1122 is inserted in the CD-ROM drive 1105 or the FD drive 1106. Alternatively, the program may be transmitted to the computer 1101 via a network (not illustrated), and may be accumulated in the hard disk 1114. The program is loaded into the RAM 1113 when executed. The program may be loaded directly from the CD-ROM 1121, the FD 1122, or the network.

The program may not necessarily include software for causing the computer 1101 to execute the functions of the foregoing exemplary embodiment of the present invention, such as the operating system (OS) or a third-party program. The program may only include an instruction portion that calls an appropriate function (or module) in a controlled mode to obtain a desired result. How the computer system 1100 operates is well established, and a detailed description thereof is omitted.

The present invention is not limited to the foregoing exemplary embodiment. It is to be understood that a variety of changes can be made and such changes also fall within the scope of the present invention. Moreover, the term "unit" as used herein, except when used in the phrase "smallest unit", may be used interchangeably with the term "module" or "circuit".

As described above, in an exemplary embodiment of the present invention, a trigger query obtaining apparatus and the like may achieve the advantage of obtaining a set of keywords for a certain category automatically or without human intervention by using logs of queries which have been used for a search, and may be used as an apparatus and the like for obtaining trigger queries.

What is claimed is:

1. A trigger query obtaining apparatus comprising:
a memory; and
a processor operatively connected to the memory, the processor being programmed to:
create a minimal directed graph, the minimal directed graph being a smallest directed graph unit having at least two nodes and a link connecting the at least two nodes, the link being directed from one of the at least two nodes to another one of the at least two nodes a direction of the link being created based on satisfying one of: a common-click condition based on a most frequent search criteria, a common-click condition based on a character-string extension criteria a common-click condition based on a best search criteria a common-query condition, or a common-user condition, each of the nodes corresponding to a search query, each search query including at least one keyword, each search query being included in at least two search logs, each of the at least two search logs including identical web page identification information identifying a web page selected by a user in search results for a search query included in each search log, each search query being used for a search to obtain a web page;
calculate a score of each node of a directed graph, which is composed of a plurality of minimum directed graphs including the created minimum directed graph, the score of each node of the directed graph including the created minimal directed graph being calculated by propagating the score of each of the nodes from a seed query, based on a link analysis for relevance to the seed query, the link analysis being performed by weighting each node of the directed graph, the seed query being a query including a keyword belonging to a specific category;
obtain and store in the memory a trigger query, the trigger query being a search query corresponding to one of the nodes of the directed graph having a calculated score that satisfies a predetermined condition, the trigger query including a keyword corresponding to a category identical to the specific category of the keyword included in the seed query;
output the obtained trigger query;
receive a new query from a terminal device, the new query being a query including a keyword to be used for a search;
output the search results based on the new query;
obtain and output, in response to the new query matches one of the trigger queries stored in the memory, a dedicated search result of a trigger-query-dedicated search for a category of a keyword included in a seed query used to obtain the matched trigger query; and
accumulate a trigger query in the memory.

2. The trigger query obtaining apparatus according to claim 1, wherein the processor is programmed to:
create a minimal directed graph having two nodes each corresponding to a search query included in one of two search logs, and a link directed from one of the two nodes which corresponds to a search query having a wider search range to the other one of the two nodes.

3. The trigger query obtaining apparatus according to claim 1, wherein:
each of the at least two search logs further includes web page identification information identifying a web page selected by a user in search results for a search query included in the search log; and
the processor is programmed to create a minimal directed graph having two nodes each corresponding to a search query included in one of two search logs, and a link directed from one of the two nodes to the other one of the two nodes, the two search logs being two search logs including identical web page identification information, at least one of which is a search log having a search query for which the web page identification information has been most frequently selected in the at least two search logs, the other one of the two nodes being a node corresponding to the search query for which the web page identification information has been most frequently selected.

4. The trigger query obtaining apparatus according to claim 1, wherein:
each of the at least two search logs further includes web page identification information identifying a web page selected by a user in search results for a search query included in the search log; and
the processor is programmed to create a minimal directed graph having two nodes each corresponding to a search query included in one of two search logs, and a link directed from one of the two nodes to the other one of the two nodes, the two search logs being two search logs including identical web page identification information and including search queries that are in a subsumption relationship, the one of the two nodes being a node corresponding to a subsumed search query in the search queries.

5. The trigger query obtaining apparatus according to claim 1, wherein:
each of the at least two search logs further includes:
web page identification information identifying a web page selected by a user in search results for a search query included in the search log; and
ranking information indicating a rank of the web page identification information in the search results; and
the processor is programmed to create a minimal directed graph having two nodes each corresponding to a search query included in one of two search logs, and a link directed from one of the two nodes to the other one of the two nodes, the two search logs being two search logs including identical web page identification information, at least one of which is a search log having highest ranking information, the other one of the two nodes being a node corresponding to the search query included in the search log having the highest ranking information.

6. The trigger query obtaining apparatus according to claim 1, wherein the processor is programmed to:
create a minimal directed graph having two nodes each corresponding to a search query included in one of two search logs including search queries that are in a subsumption relationship, and a link directed from one of the two nodes to the other one of the two nodes, the one of the two nodes being a node corresponding to a subsumed search query in the search queries.

7. The trigger query obtaining apparatus according to claim 1, wherein:
each of the at least two search logs further includes:
point-in-time information concerning a point in time when a search query included in the search log was used for a search; and
user identification information identifying a user who input the search query; and
the processor is programmed to create a minimal directed graph having two nodes each corresponding to a search query included in one of two search logs for which points in time indicated by the point-in-time information are within a predetermined period of time, and a link directed from one of the two nodes to the other one of the two nodes, the one of the two nodes being a node corresponding to a search query included in one of the two search logs which has point-in-time information indicating an earlier point in time.

8. A trigger query obtaining method comprising:
creating a minimal directed graph, the minimal directed graph being a smallest directed graph unit having at least two nodes and a link connecting the at least two nodes, the link being directed from one of the at least two nodes to another one of the at least two nodes, a direction of the link being created based on satisfying one of: a common-click condition based on a most frequent search criteria, a common-click condition based on a character-string extension criteria, a common-click condition based on a best search criteria, a common-query condition, or a common-user condition, each of the nodes corresponding to a search query, each search query including at least one keyword, each search query being included in at least two search log, each of the at least two search logs including identical web page identification information identifying a web page selected by a user in search results for a search query included in each search log, each search query being used for a search to obtain a web page;
calculating a score of each node of a directed graph, which is composed of a plurality of minimum directed graphs including the created minimum directed graph, the score of each node of the directed graph including the created minimal directed graph being calculated by propagating the score of each of the nodes from a seed query, based on a link analysis for relevance to the seed query, the link analysis being performed by weighting each node of the directed graph, the seed query being a query including a keyword belonging to a specific category;

obtaining and storing in a memory a trigger query, the trigger query being a search query corresponding to one of the nodes of the directed graph having a calculated score that satisfies a predetermined condition, and the trigger query including a keyword corresponding to a category identical to the specific category of the keyword included in the seed query;

outputting the obtained trigger query;

receiving a new query from a terminal device, the new query being a query including a keyword to be used for a search;

outputting the search results based on the new query;

obtaining and outputting, in response to the new query matches one of the trigger queries stored in the memory, a dedicated search result of a trigger-query-dedicated search for a category of a keyword included in a seed query used to obtain the matched trigger query; and accumulating a trigger query in the memory.

9. A non-transitory computer readable recording medium storing a program including instructions operable to cause a computer to perform operations comprising:

creating a minimal directed graph, the minimal directed graph being a smallest directed graph unit having at least two nodes and a link connecting the at least two nodes, the link being directed from one of the at least two nodes to another one of the at least two nodes, a direction of the link being created based on satisfying one of: a common-click condition based on a most frequent search criteria, a common-click condition based on a character-string extension criteria, a common-click condition based on a best search criteria, a common-query condition, or a common-user condition, each of the nodes corresponding to a search query, each search query including at least one keyword, each search query being included in at least two search logs, each of the at least two search logs including identical web page identification information identifying a web page selected by a user in search results for a search query included in each search log, each search query being used for a search to obtain a web page;

calculating a score of each node of a directed graph, which is composed of a plurality of minimum directed graphs including the created minimum directed graph, the score of each node of the directed graph including the created minimal directed graph being calculated by propagating the score of each of the nodes from a seed query, based on a link analysis for relevance to the seed query, the link analysis being performed by weighting each node of the directed graph, the seed query being a query including a keyword belonging to a specific category;

obtaining and storing in a memory a trigger query, the trigger query being a search query corresponding to one of the nodes of the directed graph having a calculated score that satisfies a predetermined condition, and the trigger query including a keyword corresponding to a category identical to the specific category of the keyword included in the seed query;

outputting the obtained trigger query;

receiving a new query from a terminal device, the new query being a query including a keyword to be used for a search;

outputting the search results based on the new query;

obtaining and outputting, in response to the new query matches one of the trigger queries stored in the memory, a dedicated search result of a trigger-query-dedicated search for a category of a keyword included in a seed query used to obtain the matched trigger query; and accumulating a trigger query in the memory.

* * * * *